Dec. 14, 1954     F. C. BOWER     2,696,638
EMBOSSING APPARATUS FOR WEB MATERIAL
Filed July 21, 1951     3 Sheets-Sheet 1

INVENTOR
FRED C. BOWER
BY
Marechal & Biebel
ATTORNEYS

Dec. 14, 1954     F. C. BOWER     2,696,638
EMBOSSING APPARATUS FOR WEB MATERIAL
Filed July 21, 1951     3 Sheets-Sheet 2
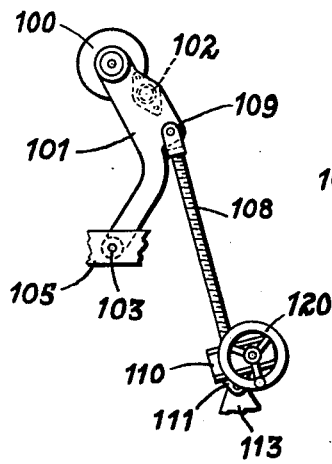
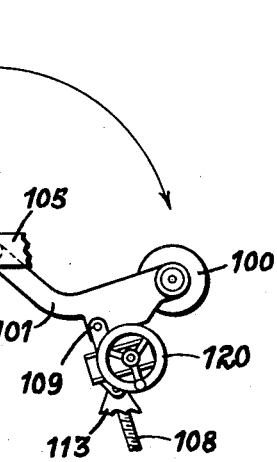
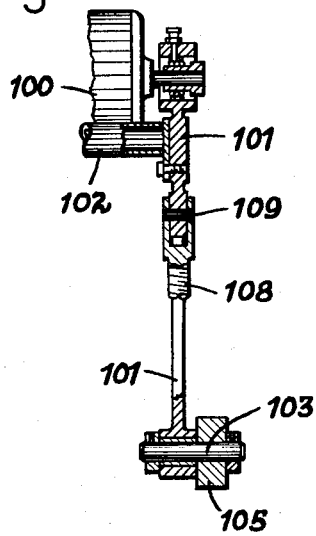
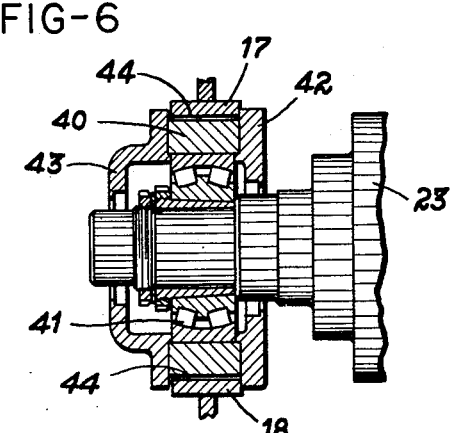
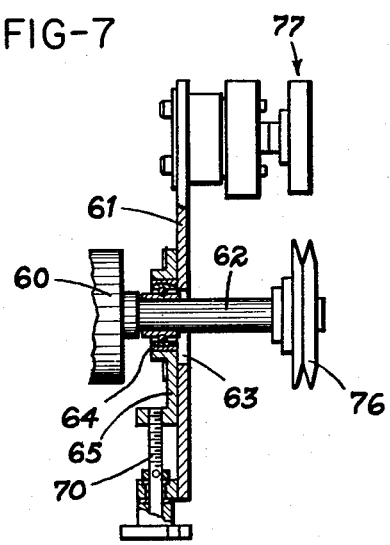
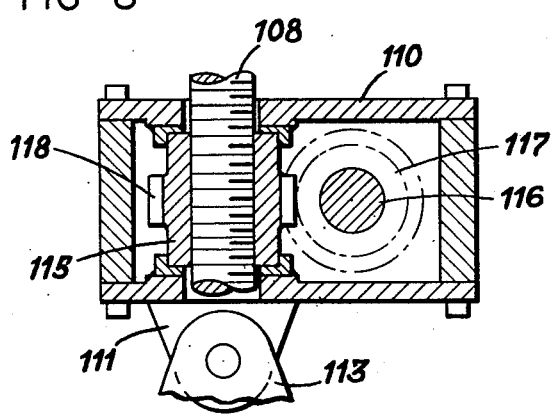
INVENTOR
FRED C. BOWER
BY
Marechal & Biebel
ATTORNEYS Dec. 14, 1954          F. C. BOWER          2,696,638

EMBOSSING APPARATUS FOR WEB MATERIAL

Filed July 21, 1951          3 Sheets-Sheet 3

INVENTOR
FRED C. BOWER
BY
Marechal & Biebel
ATTORNEYS

---

United States Patent Office 2,696,638
Patented Dec. 14, 1954

---

2,696,638

EMBOSSING APPARATUS FOR WEB MATERIAL

Fred C. Bower, Fulton, N. Y., assignor to The Black-Clawson Company, Hamilton, Ohio, a corporation of Ohio Application July 21, 1951, Serial No. 238,000

9 Claims. (Cl. 18—10)

---

This invention relates to embossing apparatus for plastic film and other web materials, and more particularly to apparatus for embossing operations wherein it is desired to change the pattern embossed on the web without interrupting the web travel.

The invention has special application to the production of plastic films by casting or extrusion from a hot melt or solution. The freshly formed film is hot and must be cooled in order to set it properly, and at the same time it is preferably calendered while cooling in order to maintain proper surface characteristics. It is also desirable to emboss the film while hot, since the embossed pattern is more readily retained by the film if imparted thereto while the film is in heated condition, and since the freshly formed film is already heated, it is advantageous to carry out the embossing operation before the film has cooled rather than to emboss at a later time when the film may have to be reheated. Another advantage of embossing freshly formed hot plastic film is that the cooling of the film can be carried out in conjunction with the embossing, since if the film is cooled immediately after embossing, as by wrapping the film around a chilled die roll in the embossing apparatus, the embossed pattern is more readily set and retained by the film.

In embossing or otherwise calendering hot plastic film as discussed above, it is highly desirable that the calendering apparatus operate continuously, since if it is shut down without interrupting the film forming apparatus, large quantities of uncalendered film may be produced and must be disposed of. This is not a problem so long as only a single embossed pattern is used, since the embosser need be operated only so long as the film is being produced, but if it is desired to change patterns without either shutting down the film forming apparatus or producing a quantity of uncalendered film, provision should be made for changing the die rolls while the machine is running.

The present invention has particular relation to continuous embossing operations of the above type, and one of the primary objects of the invention is to provide embossing apparatus having a plurality of die rolls of different patterns so arranged and mounted for operation in the apparatus that they may be operated selectively to change the pattern embossed on a continuously moving web without interrupting the travel of the web.

Another object of the invention is to provide apparatus for carrying on continuous embossing operations on an advancing web which includes a plurality of selectively operable die rolls having different patterns thereon and which also includes guide rolls associated with the die rolls in such manner that the web can be shifted from one die roll to the other and guided selectively into wrapped relation with either die roll while running substantially free of the other so that the latter can be removed and replaced if desired without interrupting the travel of the web or the embossing operation thereon.

It is also an object of the invention to provide multiple embossing apparatus as outlined above in which each die roll is mounted above a cooperating impression roll movable vertically between a position of working engagement with the die roll and a release position spaced below the die roll, and in which each pair of embossing rolls is equipped with a shiftable guide roll supported for swinging movement between a raised position guiding the web into wrapped relation with its associated die roll and a lowered position supporting the web for free travel through the nip of the associated embossing rolls in their release position leaving the die roll free for removal and replacement while the embossing operation is continued on the web by the other pair of embossing rolls.

Other objects and advantages of the invention will be apparent from the following description, the accompanying drawings and the appended claims.

In the drawings—

Figs. 3 and 4 are detail views showing the construction and operation of one of the swinging guide rolls of the apparatus of Fig. 1;

Fig. 5 is an enlarged fragmentary view looking from right to left in Fig. 3 and partly broken away and in section;

Fig. 6 is a fragmentary section through one of the end journals for one of the lower rolls, the view being in section approximately on the line 6—6 of Fig. 2;

Fig. 7 is en enlarged section on the line 7—7 of Fig. 1 showing the mounting for one of the vertically adjustable guide rolls;

Fig. 8 is a sub-assembly view in section on the line 8—8 of Fig. 2 showing the control mechanism for one of the swinging guide rolls;

Figure 9:
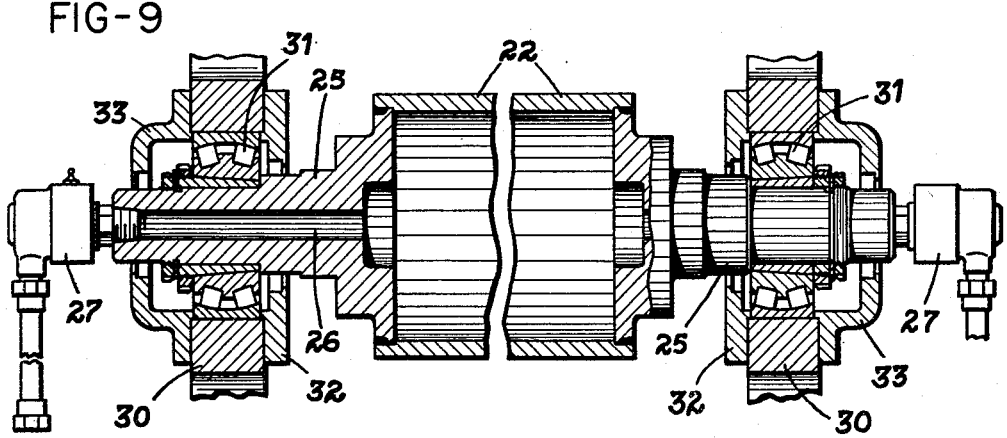
Fig. 9 is an enlarged fragmentary section through one of the die rolls on the line 9—9 of Fig. 2 and showing means for chilling the die roll.

Referring to the drawings, which illustrate a preferred embodiment of the invention, the base structure is shown as including a pair of hollow base members 13 adapted to be bolted directly to the floor and each of sufficient length to form a common support for two pairs of embossing rolls. On each base member are two rigidly secured pairs of end stands 15—16 and 17—18 respectively. The opposite pairs of end stands support corresponding pairs of embossing rolls 20—21 and 22—23, the upper rolls 20 and 22 being steel die rolls and the lower rolls 21 and 23 being impression rolls having a rubber or yieldably surfaced covering. For handling hot plastic film, the die rolls are preferably provided with a cooling system as shown in Fig. 9, in which case the roll is hollow, and its end journals 25 are provided with central bores 26 fitted at their outer ends with suitable rotary unions 27, which may be of conventional construction adapted to be connected with a source of water or other coolant for circulation through the interior of the roll to chill its working surface.

Figure 2:
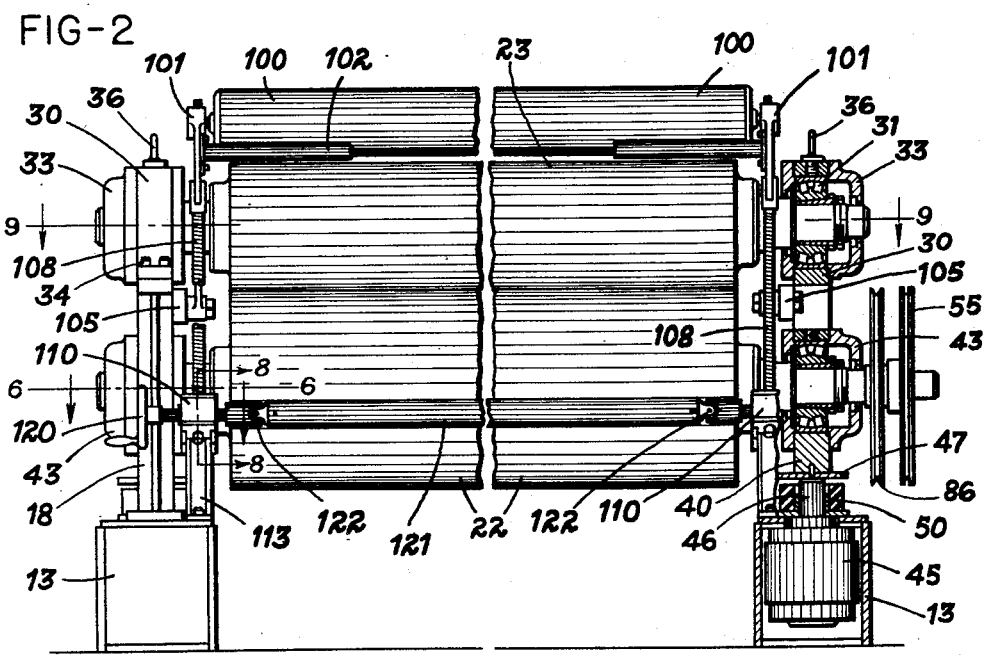
Fig. 2 is an elevational view of the apparatus, partly broken away in vertical section and looking from right to left in Fig. 1.

The die rolls 20 and 22 are supported in vertically fixed position on the end stands by a removable mounting facilitating replacement when it is desired to change the embossing pattern, while the impression rolls 21 and 23 are supported for vertical movement in the end stands between operative positions in pressure engagement with the die rolls and inoperative positions spaced from the die rolls. Referring to Figs. 2 and 9, the bearing housing 30 for each end journal of each die roll encloses a bearing 31 and is provided with inner and outer end caps 32 and 33, and each of these housings is removably secured to the upper ends of its associated end stands by means of bolts 34, accurate positioning of these bearing housings on the end stands being facilitated by means of tapered pins 35. Eye bolts 36 are set in the top of each bearing housing 30 to facilitate removal of the entrie die roll assembly from above when it is desired to change the roll.

The bearing housing 40 for each end journal of the impression rolls 22 and 23 similarly encloses a bearing 41 and is provided with inner and outer end caps 42 and 43. Each of these bearing housings is mounted for vertical sliding movement between the inner guide faces 44 (Fig. 6) of each pair of end stands, the end caps 42 and 43 overlapping the edges of the end stands to form positioning gibs for the bearing housings. Each bearing housing 40 is provided with a fluid pressure cylinder 45 located in the base and having its piston rod 46 connected with the housing 40 through a pressure plate 47 as shown. Each piston rod is provided with a yieldable bumper 50 for supporting the lower roll assembly when the pressure in the cylinders 45 is cut off, reference being made in this connection to the copending application of Robert J. Jacobs, Serial No. 207,957, filed January 26, 1951, and assigned to the same assignee as this application. It should also be noted that this embossing apparatus may be provided with a unitary base enclosing the fluid pressure system for the several cylinders 45 as disclosed in the above Jacobs application.

In embossing hot plastic film as discussed, only the impression roll in each pair of rolls is positively driven, and the drive is transmitted to the die roll by pressure engagement between the two rolls. Each impression roll may be connected as desired with the main drive (not shown) as by means of a drive sprocket or pulley as indicated diagrammatically at 55, with the drive connections for the two impression rolls being synchronized to assure rotation thereof at the same peripheral speeds.

Figure 1:
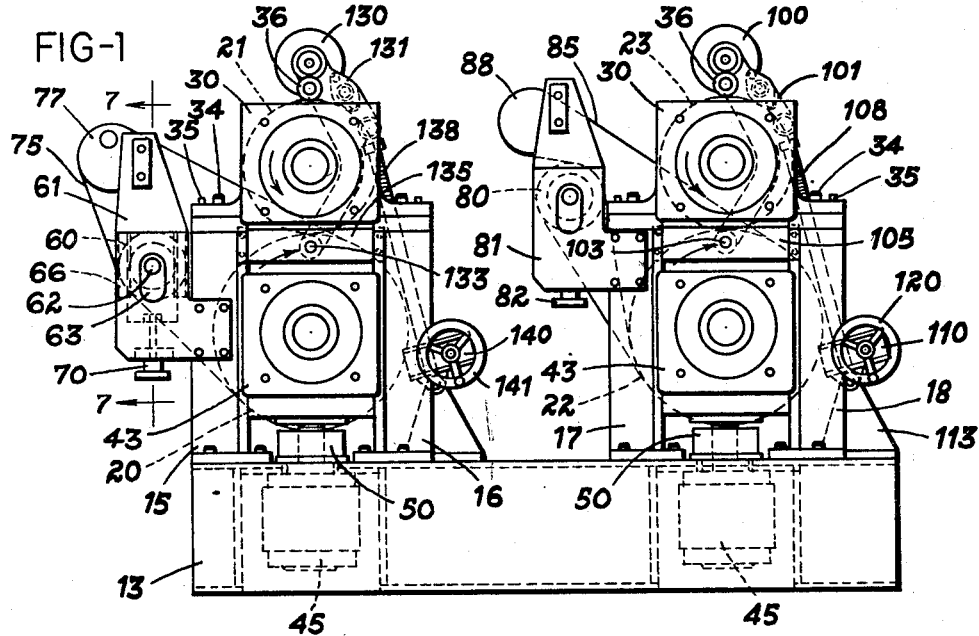
Fig. 1 is an elevational view from the control side showing embossing apparatus in accordance with the invention.

In handling hot plastic film, preferred results are obtained if the film contacts the impression roll prior to contact with the guide roll, and each pair of embossing rolls is accordingly provided with a vertically adjustable guide roll assembly for leading the web into the nip of the embossing rolls at the desired angle for contact with the impression roll ahead of the nip. Referring to Figs. 1 and 7, the adjustable guide roll 60 for the left hand pair of embossing rolls 20 and 21 is supported by a pair of brackets 61 bolted to the end stands 15. The journals 62 of the roll 60 extend through vertical slots 63 in the brackets 61 and are supported by a bearing 64 in a slide 65 mounted for vertical sliding movement by means of gibs 66 bolted to the brackets 61, and adjusting screw 70 extends through the lower end of each bracket 61 and is threaded in the end of the bearing assembly 65 to adjust its vertical position in the bracket.

The roll 60 is positively driven at substantially the same peripheral speed as the impression roll 21 by means of a belt 75 and sheave 76 driven by a sheave carried by the impression roll, the belt 75 being provided with an automatic tensioning idler assembly 77 carried by the upper end of the bracket 61 at the drive side of the apparatus. The right hand pair of embossing rolls 22 and 23 is provided with a similar vertically adjustable guide roll 80 carried by the brackets 81 bolted to the end stands 17 and provided with an adjusting screw 82. The guide roll 80 is similarly driven at substantially the same peripheral speed as the impression roll 23, as by means of the belt 85 through the sheave 86 and idler assembly 88 as shown.

Each of the pairs of embossing rolls is provided with an additional guide roll mounted for swinging movement to shift between an advanced or raised position guiding the web in wrapped relation with its associated die roll and a retracted or lowered position providing for passage of the web through the nip of its associated embossing rolls substantially without contact with the die roll. The swinging guide roll 100 for the right hand pair of embossing rolls 22 and 23 is shown in detail in Figs. 3 to 5, and it is journaled in a pair of arms 101 connected by a tie bar 102 as shown and each pivoted at 103 in a cross bar 105 bolted between the end stands 17 and 18 just below the bearing housings 30.

The arms 101 are provided with a control mechanism for raising and lowering them in unison about the pivots 103 to shift the position of the guide roll, and this control mechanism for guide roll 100 includes a pair of threaded shafts 108 each connected at its upper end to the associated arm 101 by means of a fork and pivot connection indicated at 109. Each of the threaded shafts 108 extends through a control housing 110 pivoted by means of a pair of ears 111 on an upstanding bracket 113 on base 13. Referring to Fig. 8, a nut 115 is rotatably mounted within housing 110 and receives shaft 108 in threaded engagement, and a control shaft 116 extends through housing 110 and carries a gear 117 such as a worm or helical gear meshing with complementary teeth 118 on the outer surface of nut 115.

This control unit is duplicated at both ends of roll 100 as shown in Fig. 2, with the shaft 116 at the control side of the apparatus being provided with a hand wheel 120 and the two shafts 116 being connected for conjoint rotation by means such as the cross shaft 121 and universal couplings 122. Thus referring to Figs. 3 and 4, as the hand wheel 120 is rotated, the shafts 108 are raised or lowered to produce swinging movement of the arms 101 and shifting movement of the guide roll 100 between its advanced position shown in Fig. 3 and its retracted position shown in Fig. 4.

The left hand pair of embossing rolls 20 and 21 is provided with a similar guide roll 130 and swinging mounting including arms 131 pivoted at 133 in the cross bars 135. The threaded shafts 138 may be identical with the shafts 108 as described, and they are provided with similar control housings 140 and a hand wheel 141 at the control side of the apparatus. If desired, the control systems for the two swinging guide rolls may be interconnected, as by a belt or chain, for synchronized operation to raise the roll 100 as roll 130 is lowered and vice versa.

Figure 10:
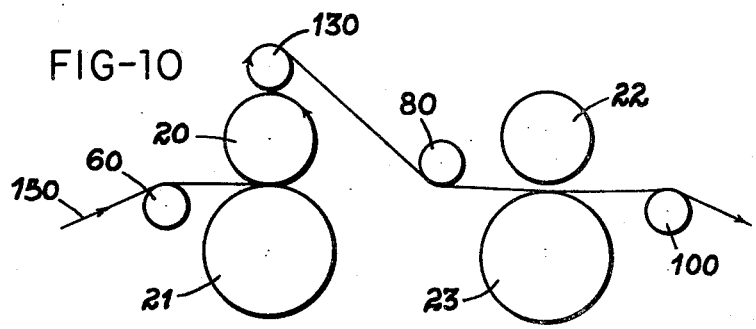
Figs. 10 to 12 are diagrammatic views illustrating the invention of the apparatus.
Figure 11:
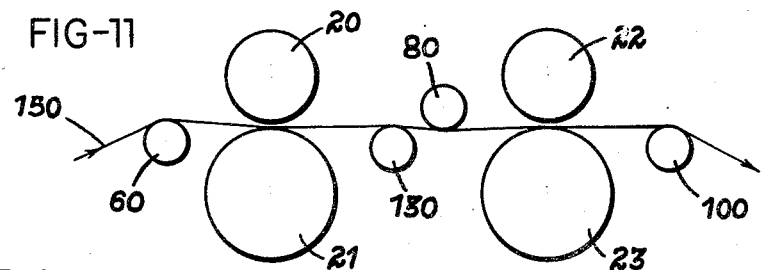
Figure 12:
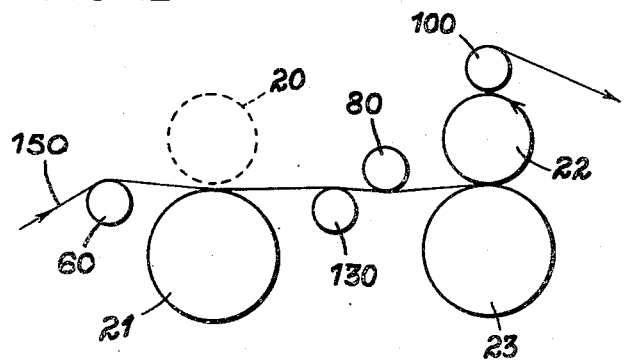

Figs. 10 to 12 illustrate the operation of the above apparatus for embossing a freshly formed plastic film or other web material 150 and changing the embossed pattern without interrupting the travel of the web. In Fig. 10, the embossing is being effected by the left hand pair of rolls 20 and 21, and as shown the web 150, which may be coming directly from the film forming apparatus, passes over the guide roll 60 into the nip of rolls 20 and 21. The swinging guide roll 130 is in its raised position in which it is approximately at the opposite side of the die roll from the nip of rolls 20 and 21 and thus causes the web to wrap approximately 180° of the die roll. The embossing rolls 22 and 23 are in their release position with their nip open, and the embossed web is led under the guide roll 80 and through the open nip of rolls 22 and 23. The swinging guide roll 100 is in its lowered or retracted position in which its upper surface is in approximately the same horizontal plane as the upper surface of the impression roll 23 and receives the web therefrom, with the web thus traveling freely through the nip of rolls 22 and 23 substantially without contact with the die roll 22.

Figs. 11 and 12 illustrate the shifting of the web from embossing rolls 20 and 21 to the right hand pair of embossing rolls 22 and 23. In carrying out this shift, the rolls 20 and 21 are released by relieving the pressure supply to their cylinders 45, thus permitting roll 21 to drop away and open the nip. At approximately the same time, the swinging guide roll 130 is moved to its lowered position to free the web from its previous wrapped relation with die roll 20. Pressure is then applied to the other pressure cylinders to raise the impression roll 23 into working engagement with die roll 22, and the swinging guide roll 100 is moved to its raised position causing the web to wrap die roll 22.

Thus the transfer of the web from one pair of embossing rolls to the other is effected simply and easily without requiring handling of the web by the operator and without interrupting the formation and travel of the web, it being readily apparent that the several roll shifting steps may be carried out either sequentially as described or substantially simultaneously. After the transfer is completed and the web is running as illustrated in Fig. 12, the die roll 20 is free and can be removed from above and replaced if desired without affecting the web, as indicated by the dotted line showing in Fig. 12, and the same is true of die roll 22 when the left hand pair of embossing rolls is in operation with the web traveling as shown in Fig. 10. It will also be noted that the swinging guide rolls assist in the control of the web in their retracted positions as well as when advanced, the left hand guide roll 130 supporting the web between rolls 21 and 80 to facilitate proper guiding action by roll 80 with relation to impression roll 23 as shown in Fig. 12, and the right hand guide roll 100 similarly supports the web leaving roll 23 as shown in Fig. 10.

While the form of apparatus herein described constitutes a preferred embodiment of the invention, it is to be understood that the invention is not limited to this precise form of apparatus, and that changes may be made therein without departing from the scope of the invention which is defined in the appended claims.

1. Embossing apparatus for web material adapted to change the embossed pattern without interrupting the passage of the web therethrough, comprising a plurality of pairs of embossing rolls each including a die roll and an impression roll, means supporting said pairs of rolls in adjacent relation, means for guiding said web through the nips of both of said pairs of rolls, means mounting certain of said guide means on said frame for selective shifting movement between positions causing said web to wrap about one or the other of said die rolls, separate means associated with each said pair of rolls for applying pressure to each said pair of rolls to provide for pressure engagement of said wrapped die roll with its associated said impression roll while maintaining the other said pair of rolls in spaced relation for free travel of said web through the nip thereof, means for operating said pressure applying means for said wrapped die roll and its associated said impression roll and for separating the other said pair of embossing rolls, and means for effecting shifting of said certain guide means between said positions thereof to transfer said web from one said pair of rolls to the other without interrupting the travel thereof.

2. Embossing apparatus for hot plastic film adapted to change the embossed pattern without interrupting the passage of film therethrough, comprising a plurality of pairs of embossing rolls each including a die roll and an impression roll, means supporting said pairs of rolls in adjacent relation, means for guiding said hot film through the nips of both of said pairs of rolls, means for chilling said die rolls, separate means associated with each said pair of rolls for applying pressure selectively to said pairs of rolls to provide for pressure engagement of a selected one of said pairs of rolls while maintaining the other said pair in spaced relation for free travel of said film therethrough, means mounting certain of said guide means on said frame for selective shifting movement between limit positions causing said film to wrap about one or the other of said die rolls to provide for wrapping of said film about said die roll in said engaged pair of rolls for embossing and simultaneous cooling and setting thereof while maintaining said film substantially free of the other said die roll during operation of said engaged pair of rolls, and means for operating said pressure applying means and for effecting shifting of said certain guide means between said limit positions thereof to transfer said web from one said pair of rolls to the other without interrupting the travel thereof.

3. Embossing apparatus for web material adapted to change the embossed pattern without interrupting the passage of the web therethrough, comprising a plurality of pairs of embossing rolls each including a die roll and an impression roll, frame means for supporting said pairs of rolls in adjacent relation, means forming a removable mounting for each of said die rolls providing for removal and replacement thereof on said frame means, means for guiding said web through the nips of both of said pairs of rolls, separate means associated with each said pair of rolls for applying pressure selectively to said pairs of rolls to provide for pressure engagement of a selected one of said pairs of rolls while maintaining the other said pair in spaced relation for free travel of said web therethrough, and means mounting certain of said guide means on said frame for selective shifting movement between limit positions causing said film to wrap about one or the other of said die rolls to provide for wrapping of said web about said die roll in said engaged pair of rolls while maintaining said web substantially free of the other said die roll for removal and replacement of said other die roll during operation of said engaged pair of rolls.

4. Embossing apparatus for web material adapted to change the embossing pattern without interrupting the passage of the web therethrough, comprising a plurality of pairs of embossing rolls each including a die roll and an impression roll, frame means for supporting said pairs of rolls in adjacent relation, means forming a removable mounting on the upper part of said frame means for each of said die rolls providing for removal and replacement thereof from above, means forming a vertically movable mounting on said frame means for each of said impression rolls, means for guiding said web through the nips of both of said pairs of rolls, pressure means for effecting vertical movement of each said impression roll into pressure engagement with its associated said die roll, said pressure means being releasable to provide for downward movement of each said impression roll to a release position spaced below said die roll and leaving the nip thereof open, and means mounting certain of said guide means on said frame for selective shifting movement between limit positions causing said web to wrap about one or the other of said die rolls while maintaining said web substantially free of the other said die roll providing for shifting the embossing operation between said pairs of rolls and for removal and replacement of one said die roll during operation of the other said die roll without interrupting the travel of said web.

5. Embossing apparatus for web material adapted to change the embossed pattern without interrupting the passage of the web therethrough, comprising a plurality of pairs of embossing rolls each including a die roll and an impression roll, means supporting said pairs of rolls in adjacent relation, means for guiding said web through the nips of both of said pairs of rolls, a guide roll associated with each said pair of rolls for receiving the web traversing the nip of said associated pair of rolls, pressure means for effecting relative movement of each said pair of embossing rolls between a working position in pressure engagement with each other and a release position spaced from each other, and control means for separately shifting each said guide roll with respect to its associated said pair of embossing rolls between an advanced position causing said web to wrap about said associated die roll in said working position of said associated pair of rolls and a retracted position providing for passage of said web through the nip of said associated pair of rolls substantially without contact with said die roll in said release position of said embossing rolls, said pressure means and said control means being arranged for alternative operation to transfer the embossing operation from one said pair of embossing rolls to the other without interrupting the travel thereof.

6. Embossing apparatus for web material adapted to change the embossing pattern without interrupting the passage of the web therethrough, comprising a plurality of pairs of embossing rolls each including a die roll and an impression roll, a frame supporting said pairs of rolls in adjacent relation with each said die roll positioned above its associated said impression roll, means for guiding said web through the nips of both of said pairs of rolls, a guide roll associated with each said pair of rolls for receiving the web traversing the nip of said associated pair of rolls, pressure means for effecting relative movement of each said pair of embossing rolls between a working position in pressure engagement with each other and a release position spaced vertically from each other, control means for separately shifting each said guide roll with respect to its associated said pair of embossing rolls between a raised position causing said web to wrap about said associated die roll in said working position of said associated pair of rolls and a lowered position providing for passage of said web through the nip of said associated pair of rolls substantially without contact with said die roll in said release position of said embossing rolls, and said pressure means and said control means being arranged for alternative operation to transfer said web from one said pair of embossing rolls to the other without interrupting the travel thereof.

7. Embossing apparatus for web material adapted to change the embossing pattern without interrupting the passage of the web therethrough, comprising a plurality of pairs of embossing rolls each including a die roll and an impression roll, a frame supporting said pairs of rolls in adjacent relation with each said die roll positioned above its associated said impression roll, means for guiding said web through the nips of both of said pairs of rolls, a guide roll associated with each said pair of rolls for receiving the web traversing the nip of said associated pair of rolls, means forming a movable mounting for each said guide roll having a pivoted connection on said frame providing for swinging movement of each said guide roll between a raised position above said associated die roll and a lowered position spaced beyond the nip of said associated pair of embossing rolls, pressure means for effecting relative movement of each said pair of embossing rolls between a working position in pressure engagement with each other and a release position spaced vertically from each other, and control means for said guide rolls operable selectively to swing each said guide roll to said raised position thereof causing said web to wrap about said associated die roll in said working position of said die roll and to shift each said guide roll to said lowered position providing for free passage of said web through the nip of said associated embossing rolls in said release position of said embossing rolls.

8. Embossing apparatus for web material adapted to change the embossing pattern without interrupting the passage of the web therethrough, comprising a plurality of pairs of embossing rolls each including a die roll and an impression roll, a frame supporting said pairs of rolls in adjacent relation with each said die roll positioned above its associated said impression roll, means for guiding said web through the nips of both of said pairs of rolls, a guide roll associated with each said pair of rolls for receiving the web traversing the nip of said associated pair of rolls, means forming a movable mounting for each said guide roll having a pivoted connection on said frame providing for swinging movement of each said guide roll between a raised position above said associated die roll and a lowered position spaced beyond the nip of said associated pair of embossing rolls, pressure means for effecting relative movement of each said pair of embossing rolls between a working position in pressure engagement with each other and a release position spaced vertically from each other, control means for said guide rolls operable selectively to swing each said guide roll to said raised position thereof causing said web to wrap about said associated die roll in said working position of said die roll and to shift each said guide roll to said lowered position providing for free passage of said web through the nip of said associated embossing rolls in said release position of said embossing rolls, means forming a removable mounting for each said die roll on said frame, and said pressure means and said control means being arranged for alternative operation to transfer the embossing operation from one said pair of embossing rolls to the other without interrupting the travel thereof and to leave the released die roll free for removal and replacement without affecting said web.

9. Embossing apparatus for web material adapted to change the embossing pattern without interrupting the passage of the web therethrough, comprising a first and a second pair of embossing rolls each including a die roll and an impression roll, a frame supporting said pairs of rolls in adjacent relation with said die rolls uppermost, means for guiding said web to the nip of said first pair of rolls for travel therethrough to said second pair of rolls, a first guide roll associated with said first pair of rolls for receiving the web traversing the nip thereof, means supporting said guide roll for movement between a raised position causing said web to wrap about said associated die roll and a lowered position supporting said web for substantially free travel through the nip of said first pair of rolls to the nip of said second pair of rolls, a second guide roll associated with said second pair of embossing rolls for receiving the web traversing the nip thereof, means supporting said second guide roll for movement between a raised position causing said web to wrap said second die roll and a lowered position supporting said web for substantially free travel through the nip of said second pair of rolls, and selectively operable pressure means for shifting each said pair of embossing rolls between a working position in pressure engagement with each other and a release position providing for free passage of said web through the nip thereof.

References Cited in the file of this patent

UNITED STATES PATENTS

| Number | Name | Date |
|---|---|---|
| 2,106,500 | Greenwood | Jan. 25, 1938 |
| 2,262,493 | Guinzburg | Nov. 11, 1941 |
| 2,277,313 | Fowler | Mar. 24, 1942 |